(12) United States Patent
Sobel

(10) Patent No.: US 8,700,896 B1
(45) Date of Patent: Apr. 15, 2014

(54) TECHNIQUES FOR AUTOMATIC MANAGEMENT OF FILE SYSTEM ENCRYPTION DRIVERS

(75) Inventor: William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 892 days.

(21) Appl. No.: 12/868,455

(22) Filed: Aug. 25, 2010

(51) Int. Cl.
*H04L 29/06* (2006.01)

(52) U.S. Cl.
USPC ............ 713/165; 713/26; 713/150; 713/164; 713/167; 713/189; 709/203; 709/220; 709/225; 726/22; 726/23; 726/26; 726/27; 718/1

(58) Field of Classification Search
USPC .......... 713/26, 150, 164–165, 167, 189, 190; 726/26, 22–23, 27; 718/1; 709/203, 709/220, 225
See application file for complete search history.

(56) References Cited

U.S. PATENT DOCUMENTS

| | | | | |
|---|---|---|---|---|
| 5,224,166 | A * | 6/1993 | Hartman, Jr. | 713/190 |
| 7,209,971 | B1 * | 4/2007 | Dabagh et al. | 709/230 |
| 7,461,406 | B2 * | 12/2008 | Pelly et al. | 726/27 |
| 8,024,810 | B2 * | 9/2011 | Saito | 726/26 |
| 8,055,913 | B2 * | 11/2011 | Ginter et al. | 713/194 |
| 8,099,605 | B1 * | 1/2012 | Billsrom et al. | 713/187 |
| 8,261,068 | B1 * | 9/2012 | Raizen et al. | 713/165 |
| 8,370,630 | B2 * | 2/2013 | Ogawa | 713/170 |
| 8,438,315 | B1 * | 5/2013 | Tao et al. | 710/8 |
| 8,539,228 | B1 * | 9/2013 | Mason et al. | 713/164 |
| 2004/0054799 | A1 * | 3/2004 | Meier et al. | 709/230 |
| 2005/0172122 | A1 * | 8/2005 | Risan et al. | 713/165 |
| 2006/0133275 | A1 * | 6/2006 | Dabagh et al. | 370/230 |
| 2007/0199074 | A1 * | 8/2007 | LeVine et al. | 726/26 |
| 2007/0226519 | A1 * | 9/2007 | Elbring | 713/190 |
| 2008/0028436 | A1 * | 1/2008 | Hannel et al. | 726/1 |
| 2008/0201454 | A1 * | 8/2008 | Soffer | 709/220 |
| 2009/0106571 | A1 * | 4/2009 | Low et al. | 713/310 |
| 2009/0113424 | A1 * | 4/2009 | Chen et al. | 718/1 |
| 2009/0113425 | A1 * | 4/2009 | Ports et al. | 718/1 |
| 2010/0049785 | A1 * | 2/2010 | Stoyanov et al. | 709/203 |
| 2010/0146267 | A1 * | 6/2010 | Konetski et al. | 713/164 |
| 2010/0306552 | A1 * | 12/2010 | Levine et al. | 713/189 |

(Continued)

OTHER PUBLICATIONS

Data Sheet; McAfee Endpoint Encryption, Unprecedented protection for vital information; McAfee, Inc.; 2009; 2 pages; Found at: http://www.mcafee.com/elqNow/elqRedir.htm?ref=http://www.mcafee.com/us/local_content/datasheets/ds_endpoint_encryption.pdf.

*Primary Examiner* — Thu Ha Nguyen
(74) *Attorney, Agent, or Firm* — Wilmer Cutler Pickering Hale and Dorr LLP

(57) ABSTRACT

Techniques for automatic management of file system encryption drivers are disclosed. In one particular exemplary embodiment, the techniques may be realized as a method for automatic management of file system encryption drivers comprising receiving a data access request at a first level encryption driver, checking an encryption indicator to identify an encryption method corresponding to the data access request, determining, using at least one computer processor, whether the data access request is to be handled at the first level encryption driver based at least in part on the identified encryption method; allowing the data access request to proceed to the first level encryption driver in the event the data access request is to be handled by the first level encryption driver; redirecting the data access request to a second level encryption driver in the event the data access request is to be handled by a second level encryption driver, and returning a result to the data access request to a requestor while ensuring that returned data is handled by an appropriate level encryption driver on a return path.

20 Claims, 10 Drawing Sheets

(56) References Cited

U.S. PATENT DOCUMENTS

2010/0306860 A1* 12/2010 Risan .............................. 726/33
2011/0072135 A1* 3/2011 Hannel et al. ................. 709/225
2011/0258456 A1* 10/2011 Lyakhovitskiy .............. 713/189
2012/0131686 A1* 5/2012 Risan et al. ..................... 726/32
2012/0198232 A1* 8/2012 Hannel et al. ................. 713/168

* cited by examiner

TECHNIQUES FOR AUTOMATIC MANAGEMENT OF FILE SYSTEM ENCRYPTION DRIVERS

FIELD OF THE DISCLOSURE

The present disclosure relates generally to encryption drivers and, more particularly, to techniques for automatic management of file system encryption drivers.

BACKGROUND OF THE DISCLOSURE

File system encryption may be performed using a plurality of algorithms. If file system encryption is to be performed using a new algorithm for a particular unit of storage (e.g., a volume) the unit of storage may need to be first unencrypted using the old algorithm and re-encrypted using the new algorithm. The amount of storage used to make a transition from an old algorithm to a new algorithm may be large, and such a transition between encryption algorithms can take significant time and system resources. Also, such a transition may require making a volume inaccessible to users while unencrypting a unit of storage, uninstalling old encryption software, installing new encryption software, and encrypting the unit of storage using the new encryption software. Additionally, in some cases two types of encryption may be used (e.g., file level encryption and disk level encryption). This may result in a portion of data such as, for example, a file, being encrypted twice (e.g., at a file level and as part of a disk level encryption). Double encryption of data may impact performance in writing and/or reading the data.

In view of the foregoing, it may be understood that there may be significant problems and shortcomings associated with current file system encryption driver management technologies.

SUMMARY OF THE DISCLOSURE

Techniques for automatic management of file system encryption drivers are disclosed. In one particular exemplary embodiment, the techniques may be realized as a method for automatic management of file system encryption drivers comprising receiving a data access request at a first level encryption driver, checking an encryption indicator to identify an encryption method corresponding to the data access request, determining, using at least one computer processor, whether the data access request is to be handled at the first level encryption driver based at least in part on the identified encryption method; allowing the data access request to proceed to the first level encryption driver in the event the data access request is to be handled by the first level encryption driver; redirecting the data access request to a second level encryption driver in the event the data access request is to be handled by a second level encryption driver, and returning a result to the data access request to a requestor while ensuring that returned data is handled by an appropriate level encryption driver on a return path.

In accordance with other aspects of this particular exemplary embodiment, the first level encryption driver may be positioned in a stack of file system drivers between an upper shim module and a lower shim module, the upper shim module receiving a data access request traversing down the stack of file system drivers and the lower shim module receiving a result of a data access request returning up the stack of file system drivers.

In accordance with further aspects of this particular exemplary embodiment, the upper shim module may determine whether a request is to be handled by the first level encryption driver, allows a data access request to proceed to the first level encryption driver in the event the data access request is to be handled by the first level encryption driver, and redirects a data access request to a second level encryption driver in the event the data access request to be handled at a second level encryption driver.

In accordance with additional aspects of this particular exemplary embodiment, returning a result to a requestor while ensuring that returned data is handled by an appropriate level encryption driver on a return path may comprise determining, using the lower shim module, whether a result to a data access request is to be returned to the first level encryption driver or whether the first level encryption driver is to be bypassed by returning the result to the upper level shim module.

In accordance with additional aspects of this particular exemplary embodiment, the second level encryption driver may be positioned in a stack of file system drivers between a second upper shim module and a second lower shim module, both the second upper shim module and the second lower shim module positioned in the stack of file system drivers below the first level encryption driver, the second upper shim module receiving a data access request traversing down the stack of file system drivers and the second lower shim module receiving a result of a data access request returning up the stack of file system drivers.

In accordance with additional aspects of this particular exemplary embodiment, the first level encryption driver may contain code that determines whether a request is to be handled by the first level encryption driver, allows a data access request to proceed to the first level encryption driver in the event the data access request is to be handled by the first level encryption driver, and redirects a data access request to a second level encryption driver in the event the data access request to be handled at a second level encryption driver.

In accordance with additional aspects of this particular exemplary embodiment, checking an encryption indicator to identify an encryption method corresponding to the data access request may be performed by at least one of: a shim and an encryption driver.

In accordance with additional aspects of this particular exemplary embodiment, checking an encryption indicator to identify an encryption method corresponding to the data access request may be performed by a control module in response to at least one of: a shim and an encryption driver.

In accordance with additional aspects of this particular exemplary embodiment, a result of the determination may be passed by a side channel communication to a module lower in the stack of file system drivers.

In accordance with additional aspects of this particular exemplary embodiment, the techniques may further include checking an encryption indicator to identify an encryption method corresponding to the data access request by at least one of: the second level encryption driver, a shim directly above the second level encryption driver, a control module in response to a request from the second level encryption driver, and a control module in response to a request from a shim directly above the second level encryption driver, determining whether the data access request is to be handled at the second level encryption driver, allowing the data access request to proceed to the second level encryption driver in the event the data access request is to be handled by the second level encryption driver, redirecting the data access request a stack of file system drivers in the event the data access request is to not be handled at the second level encryption driver.

In accordance with additional aspects of this particular exemplary embodiment, the data access request may comprise a read request.

In accordance with additional aspects of this particular exemplary embodiment, the data access request may comprise a write request.

In accordance with additional aspects of this particular exemplary embodiment, the techniques may further include setting an indicator associated with the portion of storage targeted by the write request, the indicator corresponding to an encryption driver to be used to encrypt data of the write request.

In accordance with additional aspects of this particular exemplary embodiment, a volume bit map may be checked to determine which encryption driver to use for encryption of data of the write request.

In accordance with additional aspects of this particular exemplary embodiment, the techniques may further include checking a volume bitmap against encryption bit maps of one or more portions of data of the volume to determine whether a specified portion of data of a volume has been migrated to use a new encryption driver, and uninstalling an old encryption driver in the event the specified portion data of the volume has been migrated to use the new encryption driver.

In accordance with additional aspects of this particular exemplary embodiment, the first level encryption driver may comprise a file level encryption driver and the second level encryption driver may comprise a volume level encryption driver, and the file access requests may be redirected in a manner preventing double encryption of file.

In accordance with additional aspects of this particular exemplary embodiment, checking an encryption indicator and redirecting data access requests around one or more encryption drivers may provide one or more of: a non-disruptive migration capability between a plurality of encryption drivers; an upgrade capability between encryption drivers; and operation of a plurality of encryption drivers on a single volume with an ability to specify one or more encryption drivers to be utilized for a portion of data on the volume.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process for performing a method of automatic management of encryption drivers.

In another particular exemplary embodiment, the techniques may be realized as an article of manufacture for automatic management of file system encryption drivers, the article of manufacture may comprise at least one non-transitory processor readable storage medium. Instructions may be stored on the at least one medium, wherein the instructions may be configured to be readable from the at least one medium by at least one processor and thereby cause the at least one processor to operate so as to receive a data access request at a first level encryption driver, check an encryption indicator to identify an encryption method corresponding to the data access request, determine, using a computer processor, whether the data access request is to be handled at the first level encryption driver based at least in part on the identified encryption method, allow the data access request to proceed to the first level encryption driver in the event the data access request is to be handled by the first level encryption driver, redirect the data access request to a second level encryption driver in the event the data access request is to be handled by a second level encryption driver, and return a result to the data access request to a requestor while ensuring that returned data is handled by an appropriate level encryption driver on a return path.

In yet another particular exemplary embodiment, the techniques may be realized as a system for automatic management of file system encryption drivers comprising one or more processors communicatively coupled to a network, wherein the one or more processors are configured to receive a data access request at a first level encryption driver, check an encryption indicator to identify an encryption method corresponding to the data access request, determine, using a computer processor, whether the data access request is to be handled at the first level encryption driver based at least in part on the identified encryption method, allow the data access request to proceed to the first level encryption driver in the event the data access request is to be handled by the first level encryption driver, redirect the data access request to a second level encryption driver in the event the data access request is to be handled by a second level encryption driver, and return a result to the data access request to a requestor while ensuring that returned data is handled by an appropriate level encryption driver on a return path.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
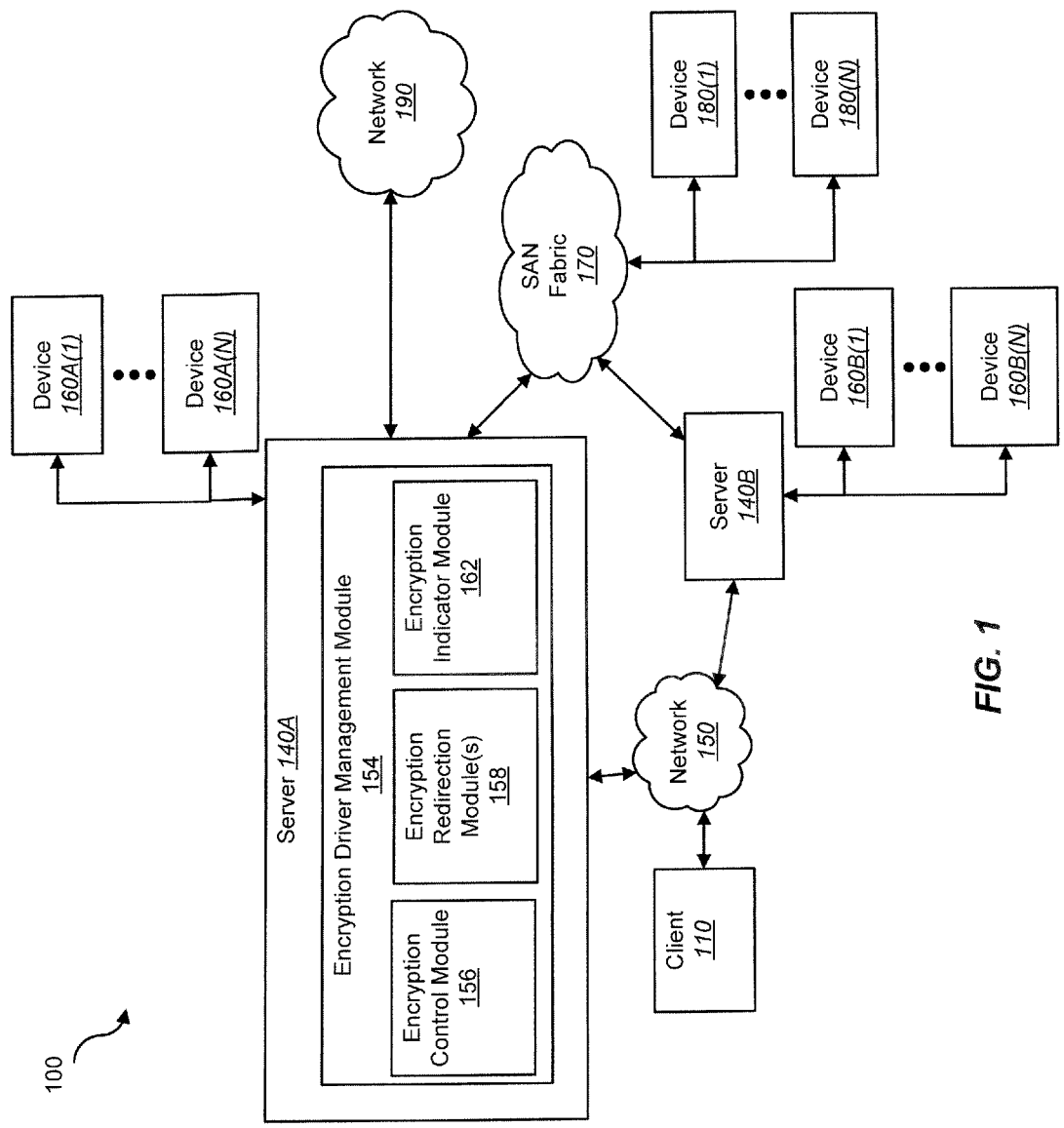
FIG. 1 shows a block diagram depicting a network architecture containing a platform for automatic management of file system encryption drivers in accordance with an embodiment of the present disclosure.

FIG. 1 shows a block diagram depicting a network architecture 100 for automatic management of file system encryption drivers in accordance with an embodiment of the present disclosure. FIG. 1 is a simplified view of network architecture 100, which may include additional elements that are not depicted. Network architecture 100 may contain client system 110 as well as servers 140A and 140B (one or more of which may be implemented using computer system 200 shown in FIG. 2). Client system 110 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client system 110 via network 150. Server 140A may be communicatively coupled to network 190.

The description below describes network elements, computers, and/or components of a system and method for automatic management of file system encryption drivers that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Server 140A may be a platform containing encryption driver management module 154. Encryption driver management module 154 may contain encryption control module 156, one or more encryption redirection modules 158, and encryption indicator module 162.

Figure 2:
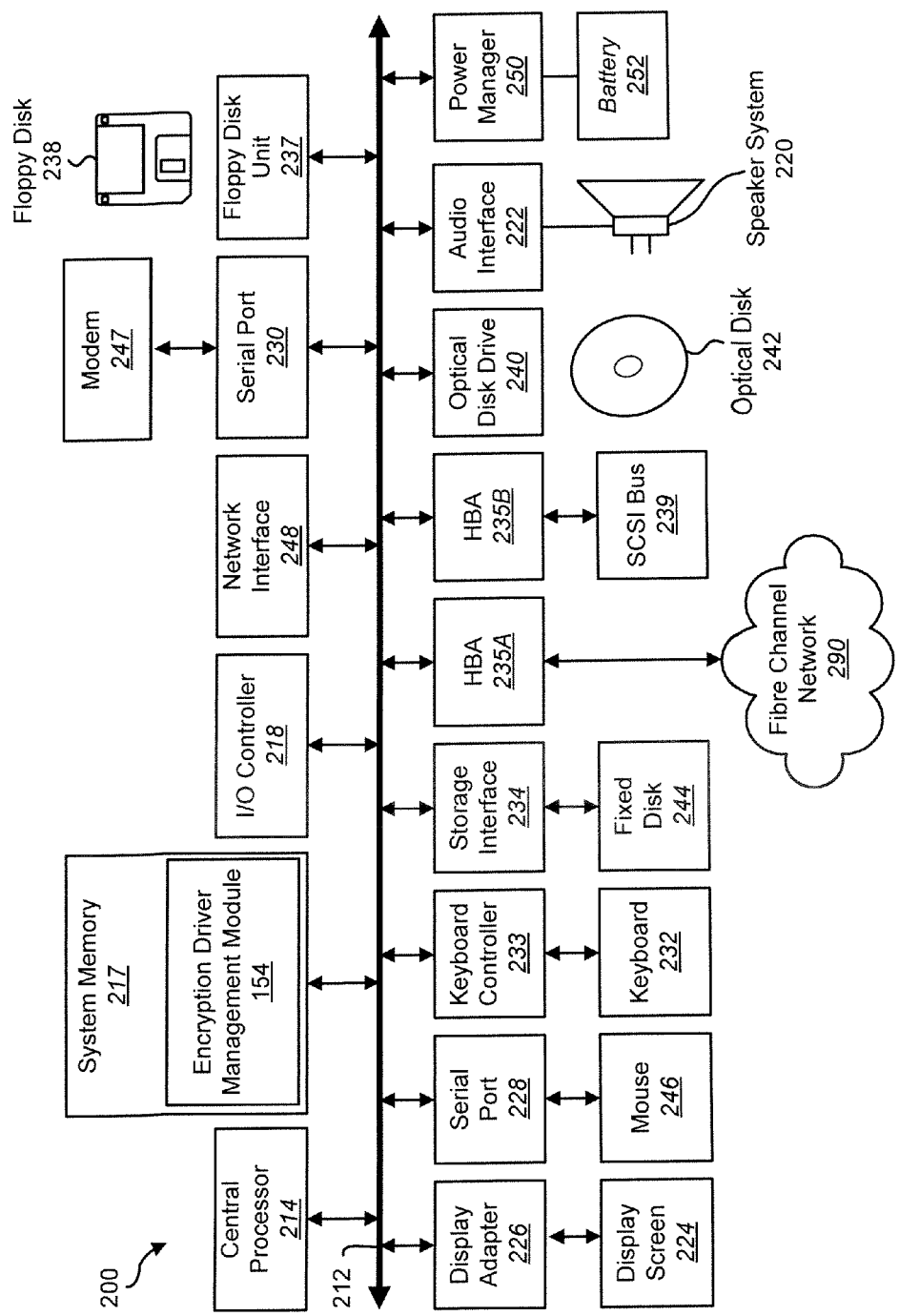
FIG. 2 depicts a block diagram of a computer system in accordance with an embodiment of the present disclosure.

With reference to computer system 200 of FIG. 2, modem 247, network interface 248, or some other method may be used to provide connectivity from one or more of client system 110 to network 150. Client system 110 may be able to access information on server 140A or 140B using, for example, a web browser or other client software. Such a client may allow client system 110 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client 110, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, client 110 may be a smartphone, PDA, desktop computer, a laptop computer, a server, another computer, or another device coupled via a wireless or wired connection to network 150. Client 110 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between client 110 and a backup platform, a backup process, and/or storage. According to some embodiments, servers 140A and 140B may be platforms used for backing up and/or archiving data.

Encryption driver management module 154 may allow the use of a plurality of encryption drivers on a same unit of storage (e.g., a volume). For example, encryption driver management module 154 may provides one or more of: a non-disruptive migration capability between a plurality of encryption drivers, an upgrade capability between encryption drivers, and operation of a plurality of encryption drivers on a single volume with an ability to specify one or more encryption drivers to be utilized for a portion of data on the volume. Encryption driver management module 154 may use one or more encryption redirection modules 158.

One or more encryption redirection modules 158 may be used to wrap an encryption driver to determine whether or not a data access request (e.g., a read or write request) or response should be passed to that driver. In the event a data access request flowing down a stack should be passed to a wrapped encryption driver, an encryption redirection module may let the request flow through to the driver. In the event a data access request is not to be handled by a driver, the encryption redirection module may redirect the data access request around the driver. According to some embodiments, an encryption redirection module 158 may be a shim, a small library, an object, or other executable or interpretable code that may intercept I/O (Input/Output) requests to an encryption driver. According to at least one embodiment, encryption redirection modules 158 may be placed in a stack above an encryption driver and below an encryption driver. This may intercept I/O requests flowing down a stack before the request reaches the driver and may intercept a response to an I/O request returning back up a stack.

According to some embodiments, some encryption drivers may contain and/or be integrated with redirection modules. In such embodiments, encryption drivers may contain executable code to redirect I/O requests around an encryption driver or allow I/O requests to flow through to an encryption driver, depending on whether the encryption driver should handle the I/O request. In such embodiments where an encryption driver is capable of handling redirection as necessary, shims or other code above and/or below an encryption driver may not be necessary.

According to some embodiments, encryption control module 156 may identify one or more appropriate encryption drivers to handle an I/O request. Encryption control module 156 may use encryption indicator module 162 to identify an appropriate encryption driver for data associated with an I/O request. According to some embodiments, encryption control module 156 may not be necessary and encryption control logic may be implemented in one or more of an encryption driver and an encryption redirection module.

Encryption indicator module 162 may be a bitmap, flag, or other indicator associated with one or more portions of data. For example, a volume may contain a single bitmap indicating a desired encryption driver or provider for the volume. One or more additional bitmaps may correspond to blocks, sectors, runs of blocks (i.e., a contiguous set of blocks), runs of sectors, or other portions of the volume. The one or more additional bitmaps may be used to indicate a current encryption driver or provider for a particular portion of data.

According to some embodiments, an encryption redirection module may be positioned in a stack directly above each encryption driver. An encryption module may also be positioned in a stack directly below each encryption driver. This may manage I/O requests flowing up and down a stack of encryption drivers. For example, when a read request is received it may be first intercepted by a top level encryption redirection module 158 sitting above a top level encryption driver in a stack of encryption drivers. The top level encryption redirection module 158 may query encryption control module 156 to determine how to handle the read request. Encryption control module 156 may check encryption indicator module 162 to determine an appropriate encryption driver for the read request. Encryption control module 156 may pass data indicating an appropriate encryption driver or an appropriate action to encryption redirection module 158. If the appropriate encryption driver is the top level encryption driver, encryption redirection module 158 may allow the read request to flow through to the top level encryption driver. The top level encryption driver may receive the request and it may be passed on an encryption redirection module located directly beneath the top level encryption driver in the stack. If the appropriate driver is not the top level encryption driver, the top encryption redirection module may pass the read request directly to an encryption redirection module below the top level encryption driver (bypassing the top level encryption driver.)

In this example, this second encryption redirection module may pass the read request down the stack to a second level encryption redirection module sitting directly above a second level encryption driver. The second level encryption redirection module (a third encryption redirection module from the top of a stack in this example) may determine whether the read request should proceed to the second level encryption driver or should be redirected around the second level encryption driver. According to some embodiments, the second level encryption redirection module may receive data from an encryption redirection module higher in a stack or from an encryption driver higher in a stack indicating which encryption driver should handle the request or which action should be taken. For example, a top level encryption redirection module may identify the appropriate encryption driver and may pass the information down a stack using side channel communication. This may allow lower level encryption redirection modules and/or drivers to receive information indicating which driver should handle the request without the lower level encryption redirection modules performing an additional query to encryption control module 156. According to some embodiments, a lower level encryption redirection module may repeat a query to encryption control module 156.

When a result to a read request is returned, encryption redirection modules may ensure that read results not handled by a particular encryption driver are redirected around the driver. Encryption redirection modules may verify an appropriate driver by querying an encryption control module or by checking an encryption indicator module directly.

According to some embodiments, when handling a write request, an encryption redirection module may verify an appropriate encryption driver to handle the write request. This may be performed by logic stored in an encryption redirection module, in a encryption control module, or in another network accessible location. An appropriate encryption driver for a write request may be determined by verifying an encryption indicator for a volume, partition, disk or other level. For example, a write request may be directed towards a block, set of contiguous blocks, sector, and/or a set of contiguous sectors. A bitmap for the storage associated with the write request may indicate that the storage is not currently encrypted and/or uses encryption driver B. However, a bitmap associated with a larger storage set including the storage of the write request (e.g., set at the volume, disk, and/or partition level) may indicate that the larger storage set (e.g., the volume) is to be migrated to encryption driver A. The encryption redirection modules may ensure that the write request is performed using the new encryption algorithm, encryption driver A. This may be performed by redirecting the write request through encryption driver A and around encryption driver B. An encryption redirection module (e.g., a top level encryption redirection module in a stack) may set a bitmap associated with storage of the write request to indicate that the storage is encrypted using encryption driver A. By using an indicator set at higher level of storage to indicate what encryption driver should be used for units of storage within that level (e.g., sectors within a volume), storage may be migrated gradually to a new encryption provider. A write request may not need to first unencrypt a portion of storage because the data is being replaced with new data. This may save additional processing and the migration may be distributed across a longer period of time which may reduce the impact to the system.

According to some embodiments, a check may be performed to determine whether any units of storage that require migration remain (e.g., any used blocks or sectors remaining using an encryption driver different from a current encryption driver indicated at a volume level). If all units of storage have been migrated from an old encryption driver, the old encryption driver and/or one or more corresponding shims or encryption redirection modules may be uninstalled. According to some embodiments, a tool may be used to facilitate migration to a new encryption driver. For example, a tool which unencrypts units of storage encrypted by an old encryption driver and encrypts them using a new encryption driver may be used. This tool may be used to transition a certain percentage of remaining units of storage (e.g., 5% or 15% of storage of a volume still encrypted using an old encryption driver after a period of time). This tool may also be used during a period of low system utilization (e.g., at night or during weekends) to reduce an impact on users.

According to some embodiments, encryption redirection modules and/or an encryption control module may be used to allow a plurality of different forms of encryption. For example, encryption redirection modules may be used to allow encryption at a file level or at disk level. For example, configuration of a volume may be changed to use encryption at a disk or volume level, however, many files of the disk or volume may be encrypted previously at a file level. Encryption redirection modules and/or an encryption control module may be used to prevent double encryption (i.e., encryption both at the file level and at the disk level), to maintain units of storage at a current level of encryption (e.g., to prevent units of storage from being transitioned between file encryption and disk encryption), and/or to migrate between levels of encryption.

Although two levels of encryption drivers are discussed, it may be appreciated that multiple levels of encryption drivers may be supported using the techniques discussed herein. It may also be appreciated that encryption drivers may be in any order in a stack and may be re-arranged (e.g., moved up or down a stack or taken out of or inserted into a stack). Logic may be used (e.g., at a control module) to track an order of encryption drivers in a stack to facilitate appropriate management of encryption drivers.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, encryption driver management module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
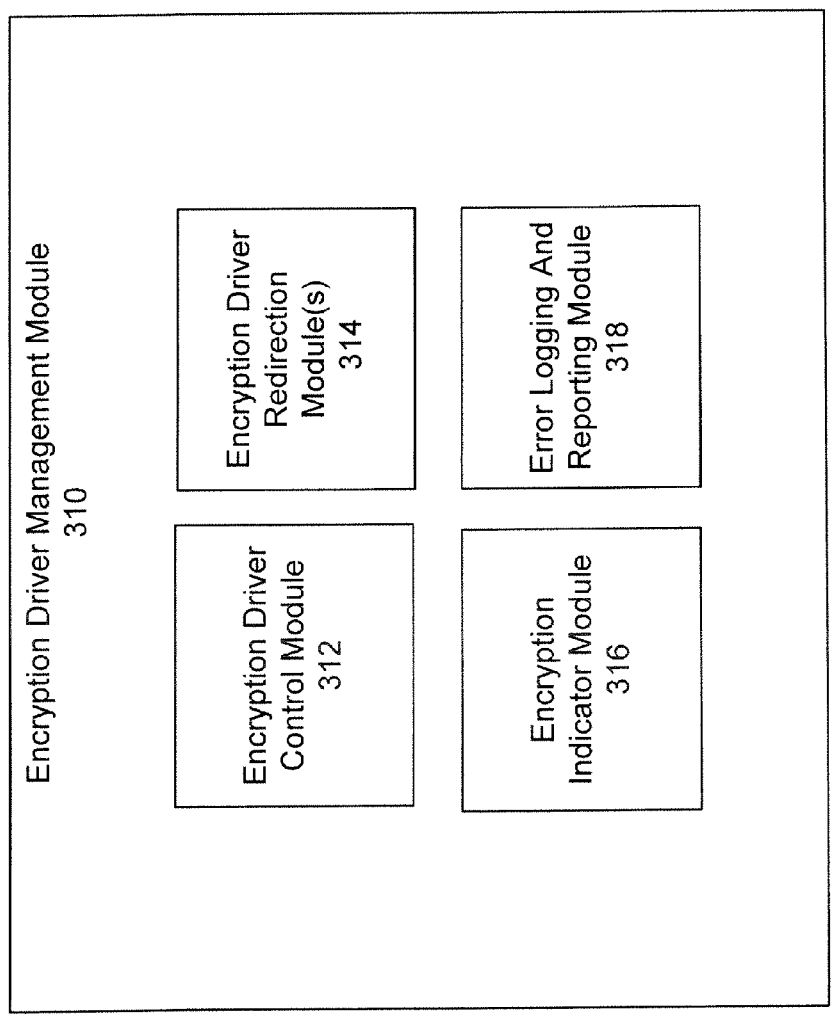
FIG. 3 shows a module for automatic management of file system encryption drivers in accordance with an embodiment of the present disclosure.

Referring to FIG. 3, there is shown an encryption driver management module 310 in accordance with an embodiment of the present disclosure. As illustrated, the encryption driver management module 310 may contain one or more components including encryption driver control module 312, encryption driver redirection module(s) 314, encryption indicator module 316, and error logging and reporting module 318.

Encryption driver control module 312 may identify one or more appropriate encryption drivers to handle an I/O request. Encryption driver control module 312 may use encryption indicator module 316 to identify an appropriate encryption driver for data associated with an I/O request. According to some embodiments, encryption driver control module 312 may not be necessary and encryption control logic may be implemented in one or more of an encryption driver and an encryption redirection module.

Encryption driver redirection module(s) 314 may be used to wrap an encryption driver to determine whether or not a data access request (e.g., a read or write request) or response should be passed to that driver. In the event a data access request flowing down a stack should be passed to a wrapped encryption driver, an encryption redirection module may let the request flow through to the driver. In the event a data access request is not to be handled by a driver, the encryption redirection module may redirect the data access request around the driver. According to some embodiments, an Encryption driver redirection module 314 may be a shim, a small library, an object, or other executable or interpretable code that may intercept I/O (Input/Output) requests to an encryption driver. According to at least one embodiment, Encryption driver redirection module(s) 314 may be placed in a stack above an encryption driver and below an encryption driver. This may intercept I/O requests flowing down a stack before the request reaches the driver and may intercept a response to an I/O request returning back up a stack.

According to some embodiments, a single encryption driver redirection module 314 may take the place of an encryption driver in a stack and may instantiate the encryption driver as necessary (i.e., if I/O is to be routed to that driver) and/or may pass a request along a stack.

According to some embodiments, some encryption drivers may contain and/or be integrated with redirection modules. In such embodiments, encryption drivers may contain executable code to redirect I/O requests around an encryption driver or allow I/O requests to flow through to an encryption driver, depending on whether the encryption driver should handle the I/O request. In such embodiments where an encryption driver is capable of handling redirection as necessary, shims or other code above and/or below an encryption driver may not be necessary.

Encryption indicator module 316 may be a bitmap, flag, or other indicator associated with one or more portions of data. For example, a volume may contain a single bitmap indicating a desired encryption driver or provider for the volume. One or more additional bitmaps may correspond to blocks, sectors, runs of blocks (i.e., a contiguous set of blocks), runs of sectors, or other portions of the volume. The one or more additional bitmaps may be used to indicate a current encryption driver or provider for a particular portion of data.

Error logging and reporting module 318 may produce logs, reports, or other information associated with automatic management of file system encryption drivers.

Figure 4:
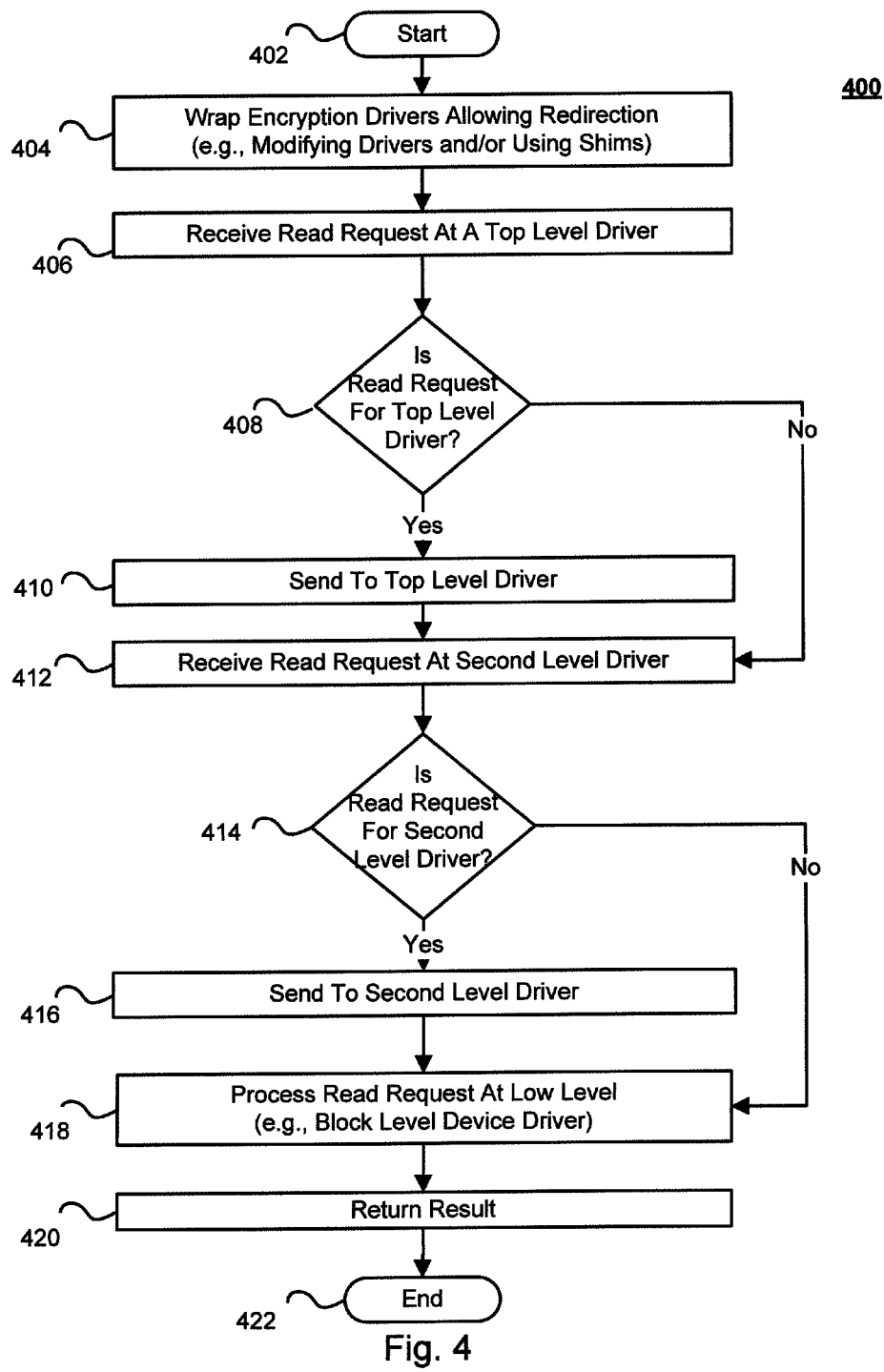
FIG. 4 depicts a method for automatic management of file system encryption drivers for a read request in accordance with an embodiment of the present disclosure.

Referring to FIG. 4, there is depicted a method 400 for automatic management of file system encryption drivers for a read request in accordance with an embodiment of the present disclosure. At block 402, the method 400 may begin.

At block 404, one or more encryption drivers may be wrapped with code (e.g., shims, libraries, and/or code integrated with or implemented into an encryption driver) allowing evaluation of and redirection of I/O requests. For example, if a new encryption driver is to be installed (e.g., an upgrade or a different vendor) a shim or library may be installed above and below an old encryption driver in a stack of drivers. The new encryption driver may be installed and may contain code permitting redirection of I/O requests and verification of an appropriate encryption driver. Alternatively, the new encryption driver in this example may be installed with a shim or encryption redirection module above it and below it in a stack of drivers.

At block 406, a read request may be received at an encryption driver at a top of a stack of encryption drivers. In embodiments in which a top level encryption driver is wrapped using a shim or redirection module, the read request may be received by a redirection module.

At block 408, it may be determined whether a read request is for a top level encryption driver. According to some embodiments, the top level encryption driver or a shim or encryption redirection module above the top level encryption driver may query to determine an appropriate encryption driver for the read request. A query may be sent to a control module which may verify an indicator to determine an appropriate encryption driver for the read request (e.g., a bitmap set at the unit of storage associated with the read request). According to some embodiments, the encryption driver or encryption redirection driver may contain control logic (e.g., logic for indicating a current level of a driver in a stack in relation to other drivers and/or logic for checking an encryption indicator) and may query an indicator directly. If the indicator set at the unit of storage associated with the read request (e.g., the sector of the read request, the block of the read request, the run of blocks of the read request, etc.) indicates that the data is encrypted with the top level encryption driver, the method may continue at block 410. If the indicator is set to another encryption driver or is not set, the method may continue at block 412, thereby skipping the top level encryption driver.

At block 410, a read request for data encrypted by the top level driver may be received by the top level encryption driver. The top level encryption driver may send the request down the stack.

At block 412, the read request may be received by a second level driver or according to some embodiments, by a shim or encryption redirection module sitting below the top level encryption driver. According to some embodiments, between two encryption drivers in a stack there may be two shims or encryption redirection modules (e.g., each encryption driver may be between a lower shim and an upper shim so that between two encryption drivers there is a lower shim for the top encryption driver and an upper shim for the bottom encryption driver). A number of shims and/or encryption redirection modules may depend on whether such logic is implemented in an encryption driver. Thus a read request handled by a shim above a top level encryption driver or by the top level encryption driver itself may be passed to a lower shim for the top level encryption driver, an upper shim of the second level driver (the third shim from the top in a stack in this example), or the encryption driver itself. The read request may be handled for step 412 at any level above the second level encryption driver or in the second level encryption driver itself if identification and redirection logic has been implemented there.

According to some embodiments, a top level encryption driver or a shim or encryption redirection module above a top level driver may pass data to a next level to indicate an appropriate action or an appropriate encryption driver to handle a request. According to some embodiments, a lower level encryption driver or a shim or encryption redirection module above a lower level encryption driver may query a control module or encryption indicator to determine an appropriate encryption driver.

At block 414, it may be determined if the read request is for the second level driver. If the read request is for the second level driver, the method 400 may continue at block 416. If the read request is not for the second level driver the read request may continue at block 418.

At block 416, the read request may be sent to the second level driver. The second level driver may pass the read request down the stack to a shim below the second level driver or to a block level device driver for processing.

At block 418, the read request may be processed at a block level device driver.

At block 420, results may be passed up a stack of drivers to be returned to a requestor. Results may be returned following a reverse path up a stack of encryption drivers which may bypass inappropriate encryption drivers and may allow the results to reach one or more appropriate encryption drivers.

At block 422, the method 400 may end.

Figure 5:
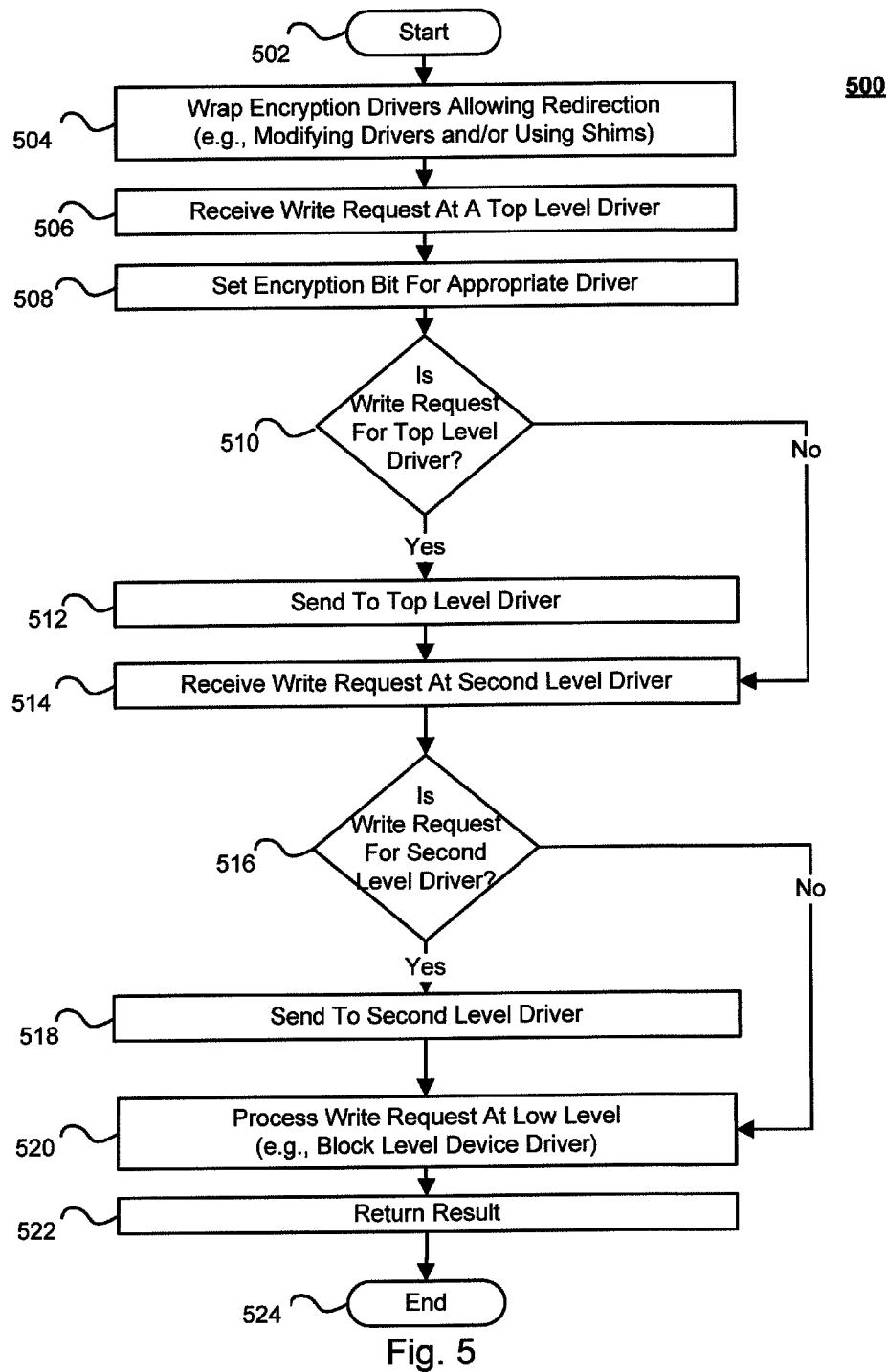
FIG. 5 depicts a method for automatic management of file system encryption drivers for a write request in accordance with an embodiment of the present disclosure.

Referring to FIG. 5, there is depicted a method 500 for automatic management of file system encryption drivers for a write request in accordance with an embodiment of the present disclosure. At block 502, the method 500 may begin.

At block 504, one or more encryption drivers may be wrapped with code (e.g., shims, libraries, and/or code integrated with or implemented into an encryption driver) allowing evaluation of and redirection of I/O requests. For example, if a new encryption driver is to be installed (e.g., an upgrade or a different vendor) a shim or library may be installed above and below an old encryption driver in a stack of drivers. The new encryption driver may be installed and may contain code permitting redirection of I/O requests and verification of an appropriate encryption driver. Alternatively, the new encryption driver in this example may be installed with a shim or encryption redirection module above it and below it in a stack of drivers.

At block 506, a write request may be received at an encryption driver at a top of a stack of encryption drivers. In embodiments in which a top level encryption driver is wrapped using a shim or redirection module, the write request may be received by a redirection module. The appropriate encryption to be used may be determined by checking a control module or an indicator set at a high level (e.g., a bitmap set a volume level or disk level) which may indicate a desired encryption driver. This indicator may be separate from an indicator, flag, or bitmap associated with the unit(s) of storage to be used by the write request (e.g., blocks or sectors). For example, a write request may be received for a sector currently encrypted with an old encryption driver as indicated by a sector level bitmap. However, a volume or disk level bitmap may indicate a new encryption driver.

At block 508, an encryption bit, flag, or other indicator may be set to indicate the encryption used for the write request (e.g., the encryption driver indicated at a high level or the new encryption driver in this example).

At block 510, if the write request is for the top level driver the method may continue at block 512. If the write request should be handled by a next level driver, the method may continue at block 514.

At block 512, a write request for data to be encrypted by the top level driver may be received by the top level encryption driver. The top level encryption driver encrypt the data and may send the request down the stack.

At block 514, the write request may be received by a second level driver or according to some embodiments, by a shim or encryption redirection module sitting below the top level encryption driver. As discussed above, logic may be implemented at a shim level or in the encryption driver itself. The sequence up or down a stack may depend on the number of shims in a stack.

At block 516, it may be determined whether the write request is to be handled by the second level driver or whether the second level driver is to be bypassed. If the write request is to be handled by the second level driver, the method may continue at block 518. If the second level driver is to be bypassed the method may continue at block 520.

At block 518, the write request may be sent to and handled by the second level driver.

At block 520, the request may be processed at a low level (e.g., a block level device driver).

At block 522, results of the write request may be returned. Results may be returned following a reverse path up a stack of encryption drivers which may bypass inappropriate encryption drivers and may allow the results to reach one or more appropriate encryption drivers.

At block 524, the method 500 may end.

It may be appreciated that encryption drivers may be stacked in any order and the order may change (e.g., an old encryption driver on a top of the stack or a new encryption driver on top of the stack). Logic may be implemented at one or more levels or external to a stack tracking an order of the stack and determining redirection necessary so that I/O bypasses inappropriate encryption drivers and passes to appropriate encryption drivers.

Figure 6:
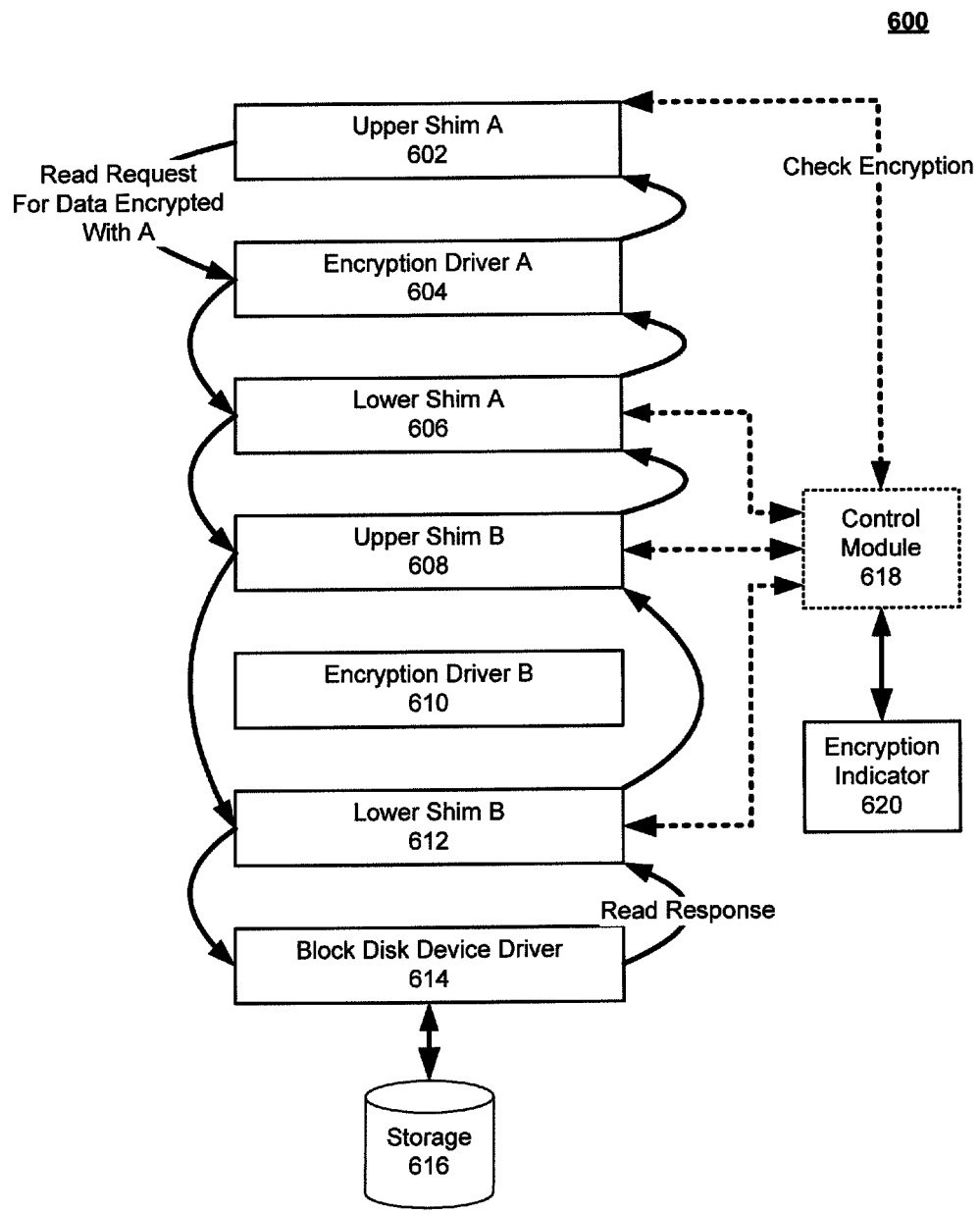
FIG. 6 depicts a flow of data during a read request using automatic management of file system encryption drivers in accordance with an embodiment of the present disclosure.

FIG. 6 depicts a flow of data during a read request using automatic management of file system encryption drivers in accordance with an embodiment of the present disclosure. As depicted a read request for Encryption Driver A may pass through a plurality of shims or encryption redirection drivers (e.g., Upper Shim A 602, Lower Shim A 606, Upper Shim B 608, Lower Shim B 612) to block disk device driver 614 to access storage 616. As illustrated the read request of FIG. 6 is for data encrypted with Encryption Driver A 604. Thus the read request passes through Encryption Driver A 604 on both the request (left side arrows) and the results return paths (right side arrows). Encryption Driver B 610 is bypassed on both the request and return paths down and up the stack.

Also illustrated is optional control module 618. As discussed above, control logic may be implemented in one or more of the shims and/or the encryption drivers. Dashed arrows indicate that control module 618 may be accessed from one or more levels and may even be optional. As discussed above, results of an initial check of a encryption driver by a top level shim (e.g., upper shim A 602) may be passed by side channel communication down a stack or by other communication interfaces (e.g., to lower shim A 606) so that further checks may not be necessary.

Although shims are illustrated, as discussed above, in some embodiments logic of some shims may be combined and/or incorporated into an encryption driver. Additionally, in some embodiments, a single shim may replace an encryption driver in a stack and may instantiate the encryption driver as necessary. According to some embodiments, a single shim may replace multiple drivers in a stack and may instantiate an appropriate encryption driver or encryption drivers as necessary.

Encryption indicator 620 may indicate encryption for storage associated with the read request.

Figure 7:
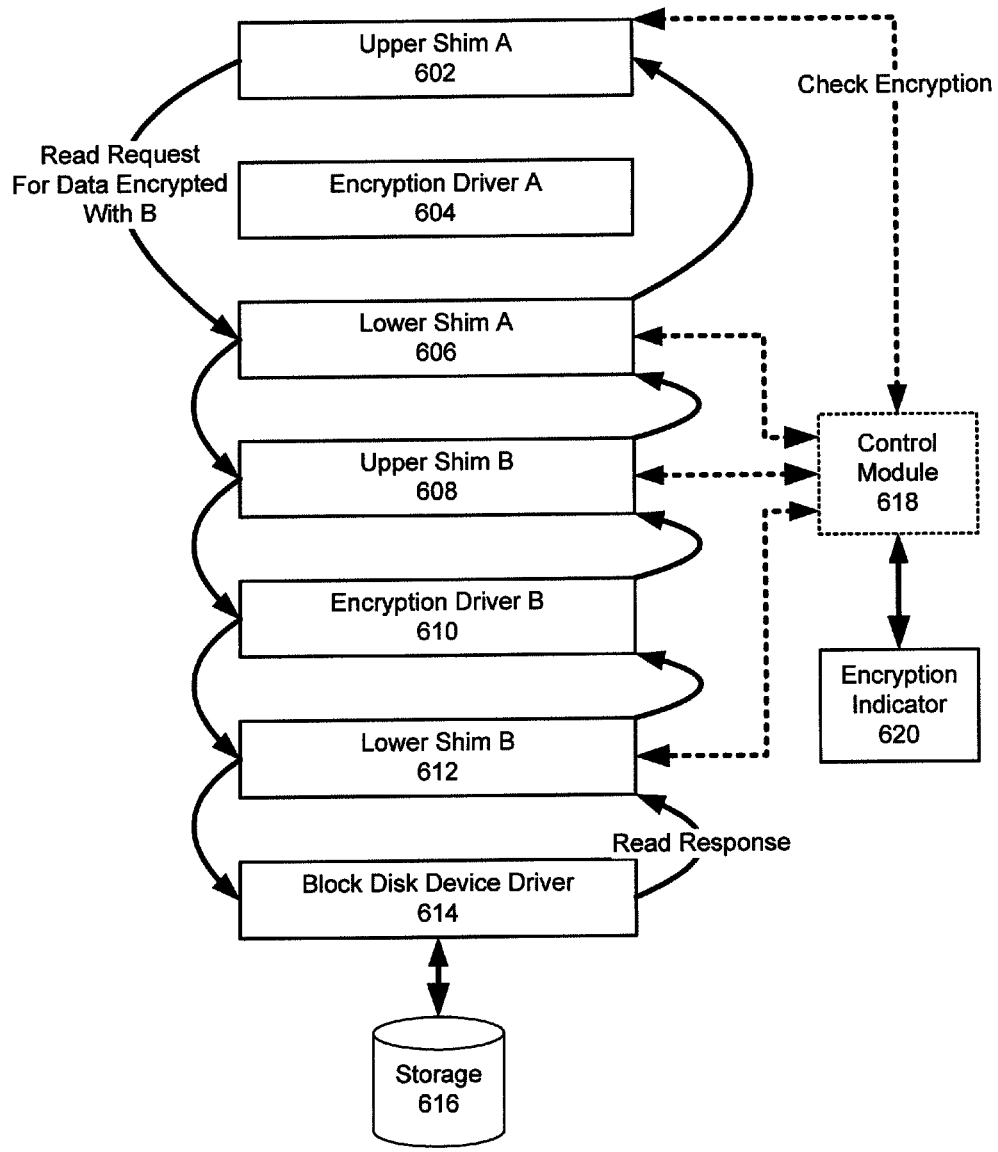
FIG. 7 depicts a flow of data during a read request using automatic management of file system encryption drivers in accordance with an embodiment of the present disclosure.

FIG. 7 depicts a flow of data during a read request using automatic management of file system encryption drivers in accordance with an embodiment of the present disclosure.

As illustrated the read request of FIG. 7 is for data encrypted with Encryption Driver B 610. Thus the read request passes through Encryption Driver B 610 on both the request (left side arrows) and the results return paths (right side arrows). Encryption Driver A 604 is bypassed on both the request and return paths down and up the stack.

Figure 8:
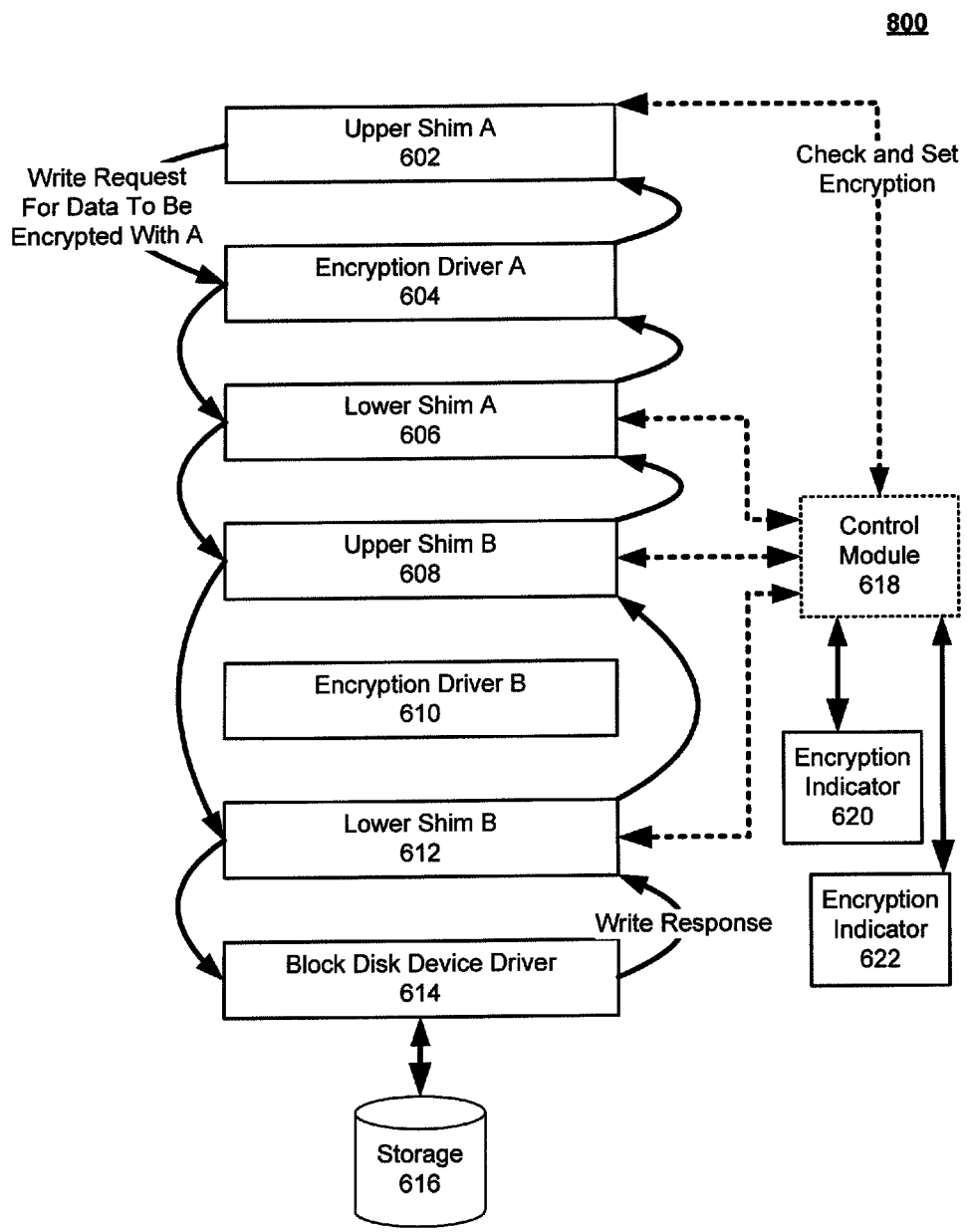
FIG. 8 depicts a flow of data during a write request using automatic management of file system encryption drivers in accordance with an embodiment of the present disclosure.

FIG. 8 depicts a flow of data during a write request using automatic management of file system encryption drivers in accordance with an embodiment of the present disclosure.

As illustrated in FIG. 8 the data is to be encrypted by Encryption Driver A 604. Thus the write request passes through Encryption Driver A 604 on both the request (left side arrows) and the results return paths (right side arrows). Encryption Driver B 610 is bypassed on both the request and return paths down and up the stack. Encryption indicator 622 may be a volume, disk, or other high level storage indicator mapping an appropriate encryption driver for the entire volume or disk. This may be an indicator showing a desired encryption driver to transition to. Encryption indicator 620 may be a current encryption driver used by a portion of storage (e.g., a sector or consecutive blocks). Upper Shim A 602 may check encryption indicator 622 to determine which driver to use for the write request (encryption driver A 602 in this example) and may set encryption indicator 620 to indicate the encryption driver used (encryption driver A 602 in this example).

Figure 9:
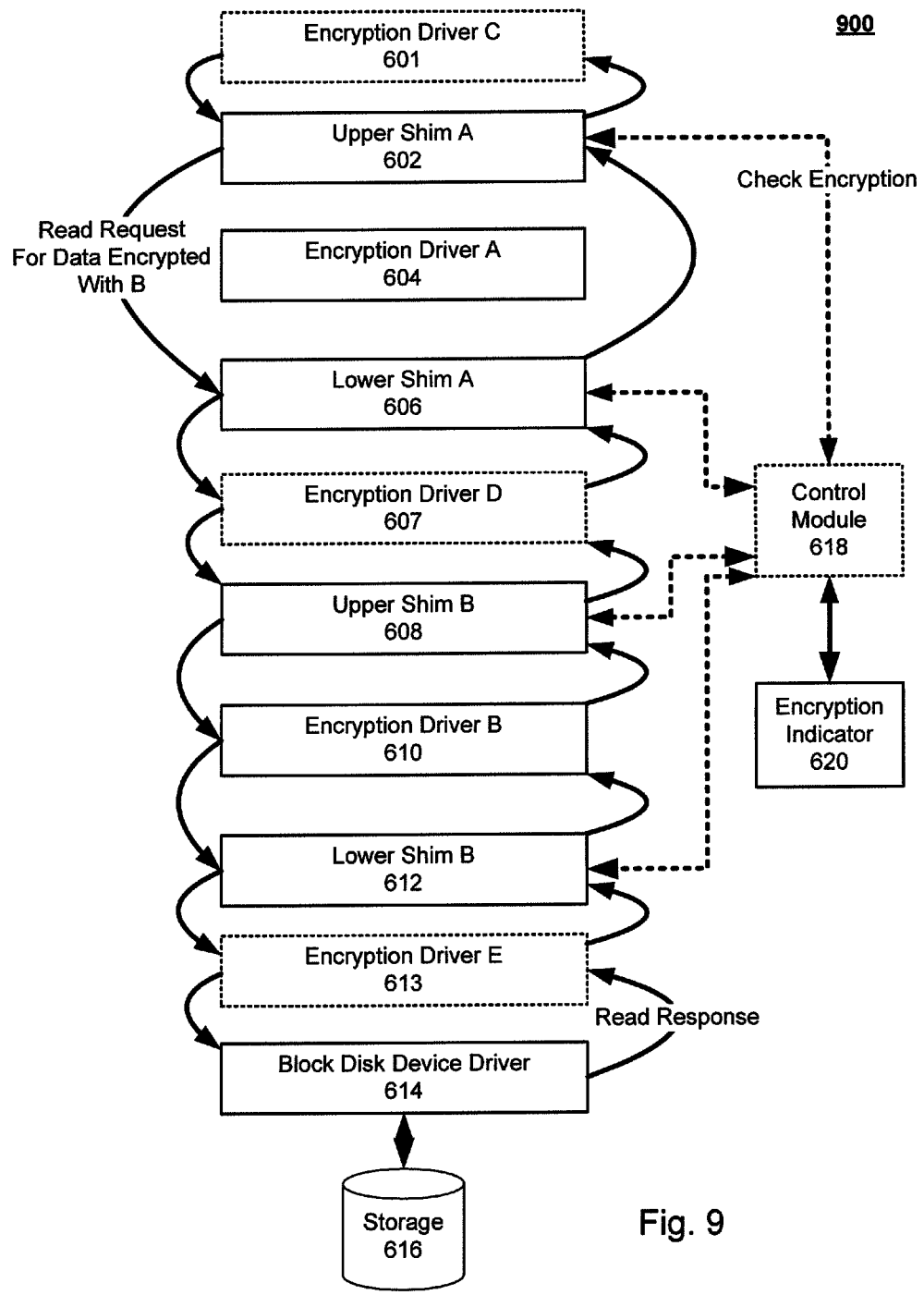
FIG. 9 depicts a flow of data during a read request using automatic management of file system encryption drivers in accordance with an embodiment of the present disclosure.

FIG. 9 depicts a flow of data during a read request using automatic management of file system encryption drivers in accordance with an embodiment of the present disclosure. As illustrated in FIG. 9, the encryption driver stacks discussed in FIGS. 6, 7, 8 may, according to some embodiments, contain other encryption drivers not wrapped using a shim, a redirection module or via other methods. As depicted in FIG. 9, in addition to the drivers discussed above in reference to FIGS. 6, 7, and 8, one or more of encryption driver C 601, encryption driver D 607, and encryption driver E 613 may be present in an encryption stack. According to some embodiments, read and write requests may flow up and down a stack and flow of data may be managed only with respect to drivers for which automatic management logic is implemented (e.g., drivers which contain or are wrapped by shims or redirection modules or drivers instantiated by shims). For example, encryption driver C 601, encryption driver D 607, and encryption driver E 613 may be drivers that are not managed by automatic management logic. Such drivers may not be bypassed and may receive all I/O communications flowing up and down a stack. A stack with as many drivers as illustrated in FIG. 9 may be unlikely and encryption driver C 601, encryption driver D 607, and encryption driver E 613 are illustrated to convey that drivers may be handled in any position and/or in all positions in a stack. However, encryption drivers wrapped by shims may be moved in a stack with their respective shims (i.e., other encryption drivers and/or shims may be added or removed above or below a wrapped encryption driver's upper or lower shim, but may not be inserted between a wrapped encryption driver and its respective upper or lower shim). For example, encryption driver A 604 may be a new driver that a file system is being transitioned to, which may be used to encrypt the entire volume. Encryption driver B 610 may be a old encryption driver used to encrypt the volume that is being migrated away from. One or more of encryption driver C 601, encryption driver D 607, and encryption driver E 613 may be encryption drivers used to encrypt one or more files of the volume (e.g., adding file level encryption on top of the volume level encryption).

According to some embodiments, all drivers in a stack may be managed and a driver inserted in a stack may be bypassed if not known.

Figure 10:
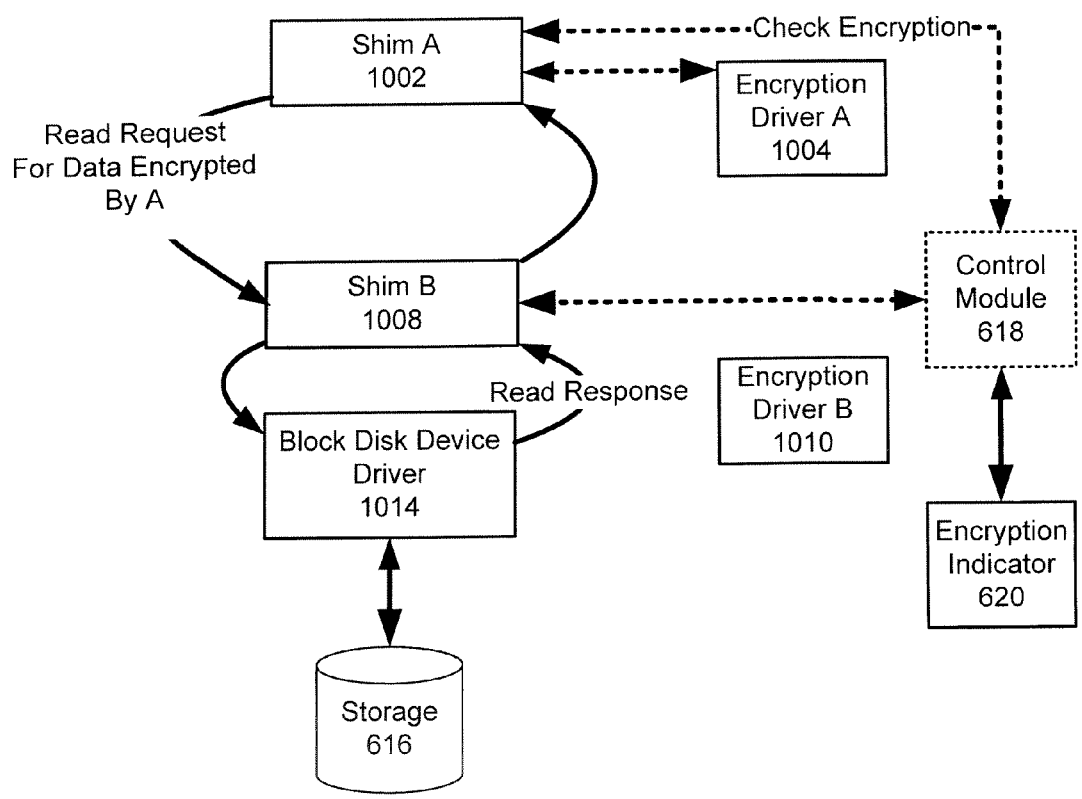
FIG. 10 depicts a flow of data during a read request using automatic management of file system encryption drivers in accordance with an embodiment of the present disclosure.

FIG. 10 depicts a flow of data during a read request using automatic management of file system encryption drivers in accordance with an embodiment of the present disclosure. Automatic management of encryption drivers may not be limited to wrapping an encryption driver with an upper and lower redirection module or shim. As illustrated in FIG. 10, according to some embodiments, a single shim may be present in a stack instead of an encryption driver with which it is associated. The shim may instantiate the encryption driver as needed. For example, shim A 1002 may receive a read request for data encrypted by encryption driver 1004. Shim A 1002 may verify the proper encryption driver to use for the read request with control module 618. Control module 618 may verify the encryption indicator for the storage associated with the read request by checking encryption indicator 620. Upon verifying that encryption driver A 1004 is to be used, shim A 1002 may instantiate encryption driver A 1004. The read request may be received by encryption driver A 1004 and may be passed to shim B 1008. Shim B 1008 may verify an appropriate encryption driver with control module 618 or may receive such information passed down the stack (e.g., via a side channel communication from shim A 1002). Shim B may not instantiate encryption driver B 1010 in this example and the read request may be passed to block disk device driver 1014. Block disk device driver 1014 may receive the read request, access storage 616 and may pass the request back up the stack. The return results may be passed to shim B 1008 which may pass the results to shim A 1002 and bypass encryption driver B 1010. Shim A 1002 may instantiate encryption driver A 1004, which may decrypt the read results and pass the data to the requestor. According to some embodiments, a single shim may be capable of instantiating multiple encryption drivers as needed and/or appropriate.

At this point it should be noted that automatic management of file system encryption drivers in accordance with the present disclosure as described above typically involves the processing of input data and the generation of output data to some extent. This input data processing and output data generation may be implemented in hardware or software. For example, specific electronic components may be employed in an encryption driver management module or similar or related circuitry for implementing the functions associated with automatic management of file system encryption drivers in accordance with the present disclosure as described above. Alternatively, one or more processors operating in accordance with instructions may implement the functions associated with automatic management of file system encryption drivers in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for automatic management of file system encryption drivers comprising:
    receiving a data access request at a first level encryption driver;
    checking an encryption indicator to identify an encryption method corresponding to the data access request, wherein the encryption indicator comprises at least a bitmap;

determining, using at least one computer processor, whether the data access request is to be handled at the first level encryption driver based at least in part on the identified encryption method;

allowing the data access request to proceed to the first level encryption driver in the event the data access request is to be handled by the first level encryption driver;

redirecting the data access request to a second level encryption driver in the event the data access request is to be handled by a second level encryption driver; and returning a result to the data access request to a requestor while ensuring that returned data is handled by an appropriate level encryption driver on a return path.

2. The method of claim 1, the first level encryption driver is positioned in a stack of file system drivers between an upper shim module and a lower shim module, the upper shim module receiving a data access request traversing down the stack of file system drivers and the lower shim module receiving a result of a data access request returning up the stack of file system drivers.

3. The method of claim 2, wherein the upper shim module determines whether a request is to be handled by the first level encryption driver, allows a data access request to proceed to the first level encryption driver in the event the data access request is to be handled by the first level encryption driver, and redirects a data access request to a second level encryption driver in the event the data access request to be handled at a second level encryption driver.

4. The method of claim 2, wherein returning a result to a requestor while ensuring that returned data is handled by an appropriate level encryption driver on a return path comprises determining, using the lower shim module, whether a result to a data access request is to be returned to the first level encryption driver or whether the first level encryption driver is to be bypassed by returning the result to the upper level shim module.

5. The method of claim 1, the second level encryption driver is positioned in a stack of file system drivers between a second upper shim module and a second lower shim module, both the second upper shim module and the second lower shim module positioned in the stack of file system drivers below the first level encryption driver, the second upper shim module receiving a data access request traversing down the stack of file system drivers and the second lower shim module receiving a result of a data access request returning up the stack of file system drivers.

6. The method of claim 1, wherein the first level encryption driver contains code that determines whether a request is to be handled by the first level encryption driver, allows a data access request to proceed to the first level encryption driver in the event the data access request is to be handled by the first level encryption driver, and redirects a data access request to a second level encryption driver in the event the data access request to be handled at a second level encryption driver.

7. The method of claim 1, wherein checking an encryption indicator to identify an encryption method corresponding to the data access request is performed by at least one of: a shim and an encryption driver.

8. The method of claim 1, wherein checking an encryption indicator to identify an encryption method corresponding to the data access request is performed by a control module in response to at least one of: a shim and an encryption driver.

9. The method of claim 1, wherein a result of the determination is passed by a side channel communication to a module lower in the stack of file system drivers.

10. The method of claim 1, further comprising:

checking an encryption indicator to identify an encryption method corresponding to the data access request by at least one of: the second level encryption driver, a shim directly above the second level encryption driver, a control module in response to a request from the second level encryption driver, and a control module in response to a request from a shim directly above the second level encryption driver;

determining whether the data access request is to be handled at the second level encryption driver;

allowing the data access request to proceed to the second level encryption driver in the event the data access request is to be handled by the second level encryption driver; and redirecting the data access request a stack of file system drivers in the event the data access request is to not be handled at the second level encryption driver.

11. The method of claim 1, wherein the data access request comprises a read request.

12. The method of claim 1, wherein the data access request comprises a write request.

13. The method of claim 12, further comprising setting an indicator associated with the portion of storage targeted by the write request, the indicator corresponding to an encryption driver to be used to encrypt data of the write request.

14. The method of claim 13, wherein a volume bit map is checked to determine which encryption driver to use for encryption of data of the write request.

15. The method of claim 13, further comprising:

checking a volume bitmap against encryption bit maps of one or more portions of data of the volume to determine whether a specified portion of data of a volume has been migrated to use a new encryption driver; and uninstalling an old encryption driver in the event the specified portion data of the volume has been migrated to use the new encryption driver.

16. The method of claim 1, wherein the first level encryption driver comprises a file level encryption driver and the second level encryption driver comprises a volume level encryption driver, and wherein the file access requests are redirected in a manner preventing double encryption of file.

17. The method of claim 1, wherein checking an encryption indicator and redirecting data access requests around one or more encryption drivers provides one or more of: a nondisruptive migration capability between a plurality of encryption drivers; an upgrade capability between encryption drivers; and operation of a plurality of encryption drivers on a single volume with an ability to specify one or more encryption drivers to be utilized for a portion of data on the volume.

18. At least one non-transitory processor readable storage medium for storing a computer program of instructions configured to be readable by at least one processor for instructing the at least one processor to execute a computer process for performing the method as recited in claim 1.

19. An article of manufacture for automatic management of file system encryption drivers, the article of manufacture comprising:

at least one non-transitory processor readable storage medium; and instructions stored on the at least one medium;

wherein the instructions are configured to be readable from the at least one medium by at least one processor and thereby cause the at least one processor to operate so as to:

receive a data access request at a first level encryption driver;

check an encryption indicator to identify an encryption method corresponding to the data access request, wherein the encryption indicator comprises at least one bitmap;

determine, using a computer processor, whether the data access request is to be handled at the first level encryption driver based at least in part on the identified encryption method;

allow the data access request to proceed to the first level encryption driver in the event the data access request is to be handled by the first level encryption driver;

redirect the data access request to a second level encryption driver in the event the data access request is to be handled by a second level encryption driver; and return a result to the data access request to a requestor while ensuring that returned data is handled by an appropriate level encryption driver on a return path.

20. A system for automatic management of file system encryption drivers comprising:

one or more processors communicatively coupled to a network;

wherein the one or more processors are configured to:

receive a data access request at a first level encryption driver;

check an encryption indicator to identify an encryption method corresponding to the data access request, wherein the encryption indicator comprises at least one bitmap;

determine, using a computer processor, whether the data access request is to be handled at the first level encryption driver based at least in part on the identified encryption method;

allow the data access request to proceed to the first level encryption driver in the event the data access request is to be handled by the first level encryption driver;

redirect the data access request to a second level encryption driver in the event the data access request is to be handled by a second level encryption driver; and return a result to the data access request to a requestor while ensuring that returned data is handled by an appropriate level encryption driver on a return path.

* * * * *